US012687968B2

(12) United States Patent
Chiew et al.

(10) Patent No.: US 12,687,968 B2
(45) Date of Patent: Jul. 21, 2026

(54) CYCLING OF MEMORY BLOCKS

(71) Applicant: MICRON TECHNOLOGY, INC.,
Boise, ID (US)

(72) Inventors: Chong Giap Chiew, Singapore (SG);
Sean Brasfield, Boise, ID (US);
Tawalin Opastrakoon, Boise, ID (US)

(73) Assignee: MICRON TECHNOLOGY, INC.,
Boise, ID (US)

( * ) Notice: Subject to any disclaimer, the term of this
patent is extended or adjusted under 35
U.S.C. 154(b) by 20 days.

(21) Appl. No.: 18/817,614

(22) Filed: Aug. 28, 2024

(65) Prior Publication Data

US 2026/0064288 A1      Mar. 5, 2026

(51) Int. Cl.
G06F 3/06          (2006.01)

(52) U.S. Cl.
CPC ........... G06F 3/0619 (2013.01); G06F 3/064
(2013.01); G06F 3/0679 (2013.01)

(58) Field of Classification Search
None
See application file for complete search history.

(56) References Cited

U.S. PATENT DOCUMENTS

| 7,596,656 B2 | 9/2009 | Elhamias | |
| 7,936,467 B2 * | 5/2011 | Shimizu | H04N 1/00856 |
| | | | 358/1.14 |
| 9,021,177 B2 | 4/2015 | Segal et al. | |

| 9,099,182 B1 | 8/2015 | Montierth et al. | |
| 9,727,455 B2 | 8/2017 | Sutardja | |
| 2013/0322181 A1 * | 12/2013 | Parker | G11C 16/04 |
| | | | 365/185.19 |
| 2016/0099061 A1 * | 4/2016 | Ziperovich | G11C 16/16 |
| | | | 365/185.11 |
| 2016/0179430 A1 * | 6/2016 | Kong | G06F 3/0604 |
| | | | 711/102 |
| 2017/0062059 A1 * | 3/2017 | Kim | G11C 16/14 |
| 2019/0369881 A1 * | 12/2019 | Porter | G11C 7/1036 |
| 2020/0065174 A1 * | 2/2020 | Zeng | G11C 16/3404 |
| 2021/0019255 A1 * | 1/2021 | Akin | G06F 12/0246 |
| 2021/0174889 A1 * | 6/2021 | Ju | G11C 29/24 |
| 2021/0225451 A1 * | 7/2021 | Seo | G11C 11/5628 |
| 2022/0197792 A1 * | 6/2022 | Chae | G06F 12/0246 |
| 2023/0377656 A1 * | 11/2023 | Pham | G11C 16/3404 |
| 2025/0390379 A1 * | 12/2025 | Huang | G06F 11/1044 |

\* cited by examiner

*Primary Examiner* — Jared I Rutz
*Assistant Examiner* — Elias Young Kim
(74) *Attorney, Agent, or Firm* — Tarolli, Sundheim,
Covell & Tummino LLP

(57)          ABSTRACT

A method for managing wear leveling in a non-volatile
memory device, the method initiating, by a memory con-
troller, a block cycling operation on a memory block within
the non-volatile memory device. The method includes
selecting, by the memory controller, a block cycling mode
from a set of block cycling modes. The method also includes
outputting, by the memory controller, a block cycling feature
command to a local media controller of a memory device
that includes the memory block. The method includes
executing, by the local media controller, the selected block
cycling mode to program the memory block responsive to
the block cycling feature command to increase a wear level
of the memory block.

20 Claims, 7 Drawing Sheets

200

| Wordline | Page | | | |
|---|---|---|---|---|
| | 0 | 1 | 2 | 3 |
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |
| 16 | 64 | 65 | 66 | 67 |
| 17 | 68 | 69 | 70 | 71 |
| 18 | 72 | 73 | 74 | 75 |
| 19 | 76 | 77 | 78 | 79 |
| ... | ... | ... | ... | ... |
| 233 | 932 | 933 | 934 | 935 |

PV
RANDOM
DATA

RANDOM
DATA

| Wordline | Page | | | |
|----------|------|------|------|------|
|          | 0 | 1 | 2 | 3 |
| 0        | 0    | 1    | 2    | 3    |
| 1        | 4    | 5    | 6    | 7    |
| 2        | 8    | 9    | 10   | 11   |
| 3        | 12   | 13   | 14   | 15   |
| 4        | 16   | 17   | 18   | 19   |
| 5        | 20   | 21   | 22   | 23   |
| 6        | 24   | 25   | 26   | 27   |
| 7        | 28   | 29   | 30   | 31   |
| 8        | 32   | 33   | 34   | 35   |
| 9        | 36   | 37   | 38   | 39   |
| 10       | 40   | 41   | 42   | 43   |
| 11       | 44   | 45   | 46   | 47   |
| 12       | 48   | 49   | 50   | 51   |
| 13       | 52   | 53   | 54   | 55   |
| 14       | 56   | 57   | 58   | 59   |
| 15       | 60   | 61   | 62   | 63   |
| 16       | 64   | 65   | 66   | 67   |
| 17       | 68   | 69   | 70   | 71   |
| 18       | 72   | 73   | 74   | 75   |
| 19       | 76   | 77   | 78   | 79   |
| ...      | ...  | ...  | ...  | ...  |
| 233      | 932  | 933  | 934  | 935  |

PV RANDOM DATA

RANDOM DATA

| WLG | Wordline | Page | | |
|---|---|---|---|---|
| WLG 0 | 0 | 0 | 1 | 2 |
| | 1 | 4 | 5 | 6 |
| | 2 | 8 | 9 | 10 |
| | 3 | 12 | 13 | 14 |
| | 4 | 16 | 17 | 18 |
| | 5 | 20 | 21 | 22 |
| | 6 | 24 | 25 | 26 |
| | 7 | 28 | 29 | 30 |
| | 8 | 32 | 33 | 34 |
| WLG 1 | 9 | 36 | 37 | 38 |
| | 10 | 40 | 41 | 42 |
| | 11 | 44 | 45 | 46 |
| | 12 | 48 | 49 | 50 |
| | 13 | 52 | 53 | 54 |
| | 14 | 56 | 57 | 58 |
| | 15 | 60 | 61 | 62 |
| | 16 | 64 | 65 | 66 |
| | 17 | 68 | 69 | 70 |
| WLG 2 | 18 | 72 | 73 | 74 |
| | 19 | 76 | 77 | 78 |
| | ... | ... | ... | ... |
| WLG N | 233 | 932 | 933 | 934 |

PV RANDOM DATA

RANDOM DATA

500

INITIATE BLOCK CYCLING — 510

IDENTIFY MEMORY DEVICE HAVING BLOCK IN NEED OF CYCLING — 515

SELECT BLOCK CYCLING MODE — 520

OUTPUT BLOCK CYCLING FEATURE COMMAND TO LOCAL MEDIA CONTROLLER — 525

EXECUTE BLOCK CYCLING — 530

PROVIDE COMPLETION INDICATION — 535

CYCLING OF MEMORY BLOCKS

TECHNICAL FIELD

This disclosure relates to cycling of blocks of memory of a non-volatile memory device.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Wear of non-volatile devices refers to the physical degradation that occurs each time a memory block is programmed (written to) and erased. Memory cells of a non-volatile memory device store data by trapping electrons within a floating gate, which alters the threshold voltage of the cell to represent data bits. Each program-erase cycle introduces stress to the tunnel oxide layer, gradually degrading an ability of the storage node to trap electrons effectively. Over time, this wear can lead to data retention issues or cell failure, as the cell may no longer reliably hold the charge needed to represent the stored data. To manage and mitigate wear, non-volatile memory systems employ wear leveling algorithms that aim to distribute the program-erase cycles evenly across all memory blocks, thus ensuring no single block wears out prematurely compared to others. This uniform wear helps extend the overall lifespan of the memory device.

BRIEF DESCRIPTION OF THE DRAWINGS

FIG. 1B illustrates a process flow of the system of FIG. 1A depicting operations a block cycling feature of a local media controller.

DETAILED DESCRIPTION

Figure 1A:
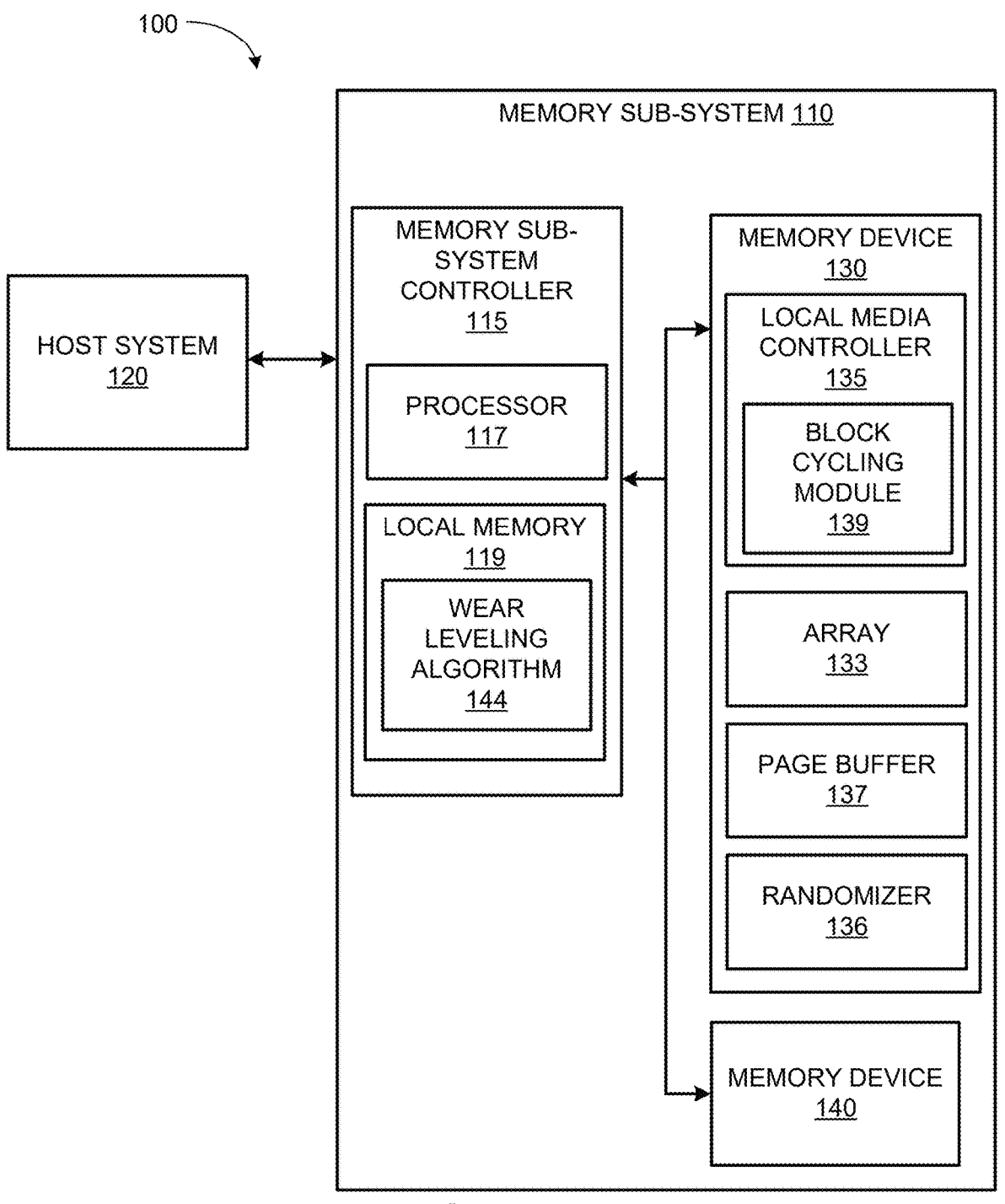
FIG. 1A illustrates a system that includes a memory sub-system for cycling memory blocks to increase a wear level of the memory blocks.

This description relates to managing wear leveling in non-volatile memory devices, such as Not-AND (NAND) memory systems by introducing a block cycling capability that allows a local media controller of the memory device to autonomously execute program-erase cycles on memory blocks. This feature reduces the operational demands on a memory sub-system controller. In some examples, the memory device includes an integrated randomizer that generates data patterns directly within the memory device, avoiding the need for external data generation and enhancing the efficiency of the block cycling process. Additionally or alternatively, the memory device can be programmed with acceleration modes, such as wordline, wordline group and block acceleration modes, which facilitate the simultaneous programming of multiple pages or entire blocks. This approach not only speeds up the wear leveling process but also extends the durability and reliability of the non-volatile memory devices by promoting uniform wear across all blocks.

More generally, some examples of a memory sub-system include high density non-volatile memory devices where retention of data is desired during intervals of time where no power is supplied to the memory device. One example of non-volatile memory devices is a NAND memory device. A non-volatile memory device is a package that includes a die(s). Each such die can include a plane(s). For some types of non-volatile memory devices (e.g., NAND memory devices), each plane includes a set of physical blocks, and each physical block includes a set of pages that are organized in wordlines. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as '0' and '1', or as combinations of such values, such as '00', '01', '10' and '11'.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block (alternatively referred to as a memory block) refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory device(s).

A memory page in the context of non-volatile memory devices, such as NAND memory, refers to a smallest writable unit within the memory structure. Each memory page is formed with of numerous memory cells where data is stored. In NAND memory, for example, a memory page is where actual user data gets written along with additional metadata used for managing the memory and ensuring data integrity. This metadata might include error correction codes (ECC) that help detect and correct errors that might occur during data read/write cycles. The size of a memory page can vary depending on the specific type of memory technology and the manufacturer's design. Common page sizes in NAND memory range from 4 KB to 16 KB or more.

Memory pages are organized into wordlines, which are in turn organized into blocks. More specifically, in NAND memory, the relationship between blocks, wordlines and pages is structured hierarchically for operation of the memory. A block represents a fundamental unit of data storage in NAND memory and consists of several pages. Wordlines in NAND memory are essentially wirings that connect multiple memory cells across a row. Each wordline activates a specific row of cells during read and write operations, effectively addressing all the cells in a row simultaneously, which corresponds to accessing a single page of data. Wordlines enable addressing and accessing data stored in the memory cells. In effect, a wordline controls access to a set of pages of data. When a specific wordline is activated, all the memory cells along that wordline can be accessed simultaneously. This means that each page corresponds to a wordline, and the data stored in a page is written to or read from the memory cells that the wordline addresses. When data is written to NAND memory, the organization and storage occur at the page level. This hierarchical structure allows for efficient management of data.

In the memory sub-system, superblocks refer to logical groupings of memory blocks that combine multiple physical blocks from different memory devices (e.g., different memory chips) or from different planes within a single memory device (e.g., a single chip). The employment of superblocks enhances data management and wear leveling by distributing write and erase cycles across a broader array of memory cells. Superblocks facilitate efficient handling of data, allowing for simultaneous operations over multiple blocks, which tunes the performance and endurance of the memory system. However, the integrity and performance of a superblock can be compromised if one of the constituent blocks of the superblock fails or becomes excessively worn compared to others. This uneven wear can lead to data integrity issues and system reliability problems.

Spare blocks in the memory sub-system serve as a reserve of unused blocks, set aside to replace any blocks that degrade or fail over time. Spare blocks are employed for maintaining data integrity and system reliability, as spare blocks provide replacements for blocks that are no longer usable due to excessive wear from repeated program-erase cycles or due to defects. The availability of spare blocks ensures that the memory system can continue to function effectively without loss of data or significant degradation in performance, even as some blocks reach the end of their operational life.

The spare blocks are employed replace worn-out or failed blocks within superblocks. The previous approaches for preparing these spare blocks for replacement is time-consuming and resource-intensive, involving data generation, data clocking into the memory device and full block programming. These operations can slow down system operations. Furthermore, if the wear level of the spare block does not closely match the wear levels of the other blocks in the superblock, replacing a block can still lead to disparities in wear, affecting the overall reliability and data integrity of the memory sub-system.

To address these issues (e.g., preparing the spare blocks and/or other blocks), the memory device includes a block cycling feature that allows for more autonomous and efficient cycling of blocks (e.g., repeatedly writing random data or erasing the blocks), including spare blocks. In some examples, this block cycling feature enables the generation of random data patterns internally within the memory device, reducing dependency on the system controller for data generation and management. Additionally, various acceleration modes, such as a Wordline (WL) Acceleration mode, a Wordline Group (WLG) Acceleration mode and a Block Acceleration mode are introduced to enable faster and more efficient programming of blocks. These enhancements not only speed up the process of preparing spare blocks for use but also ensure that these blocks can be integrated into superblocks with a reduced wear level disparity, maintaining the integrity and performance of the superblock structure. This approach enhances the wear leveling process, improves system reliability, and maintains data integrity across the memory sub-system.

The generation of random data within the memory device leverages a randomizer integrated with a die of the memory device. The randomizer is programmed to autonomously create data patterns. This randomizer is employed for the wear leveling process as each memory cell within the block experiences uniform stress and wear. In a mode referred to as a Randomizer Assisted Block Program mode, the local media controller causes the randomizer to generate a unique pattern for each page across the block. Each page receives programming with this distinct pattern, mimicking the natural variability in data that would typically be written to memory cells of the memory device during regular use. These operations curtail a wear level disparity across the memory cells, enhancing the longevity and reliability of the memory device. Further, by generating random data directly within the memory device, reliance on external systems for data preparation and input is reduced, streamlining the entire wear leveling process.

The Wordline (WL) Acceleration mode offers a more efficient approach by leveraging the on-die randomizer to enhance programming speed. In the WL Acceleration mode, the randomizer generates a random data pattern for the first page of each wordline within the block. This initial pattern serves as the template for programming the entire wordline. In response to establishing this pattern, the same data is programmed contemporaneously to each page within a wordline, avoiding the need for sequential page programming. The WL acceleration mode accelerates the programming process of the block, as multiple pages are programmed in one operation. The WL Acceleration mode not only reduces the total time needed for programming the block but also proves particularly beneficial in environments where rapid data throughput and quick access times are needed. Despite the faster programming speeds, the WL acceleration mode ensures effective wear leveling. Each wordline, starting with a uniquely generated random pattern, distributes wear evenly across the memory block. This strategy curtails excessive wear in any specific area, thereby extending the lifespan of the memory device and maintains a balance between speed and efficiency in data programming.

Building on the efficiency of the WL Acceleration mode, the Wordline Group (WLG) Acceleration mode further improves an operational speed of the cycling of the block. In the WL Acceleration mode, the on-die randomizer generates a random data pattern for the first page of each wordline group within the block. This pattern then serves as the template for programming an entire wordline group. The process involves programming each page of a selected wordline group in parallel with the corresponding random data pattern, followed by sequential programming of the next wordline group in the block. The WLG Acceleration mode enhances the programming speed by reducing the number of programming cycles needed for each WL group, allowing for multiple pages across different wordlines in each wordline group to receive programming contemporaneously. The WLG Acceleration mode not only accelerates the data programming process but also maintains effective wear leveling by ensuring that each group starts with a uniquely generated random pattern. This approach distributes wear evenly across larger sections of the memory block, enhancing both the performance and longevity of the NAND flash memory system.

The Block Acceleration mode further improves efficiency in programming of the block. The Block Acceleration mode programs all wordlines in a block contemporaneously. The process utilizes a pre-program pulse from an erase algorithm, which is applied across an entirety of the block. This pre-program pulse elevates a threshold voltage of each cell of the memory block uniformly before the block is erased in the same operation. Parameters of the pre-program pulse, such as voltage, step size, pulse width and pulse count are configurable, allowing precise control over the wear effect on the block. The Block Acceleration mode is advantageous for applications needing rapid processing and high throughput, as the entirety of the block receives programming in one concerted operation. The uniform application of the pre-program pulse ensures that wear is evenly distributed across the block, thereby enhancing the durability and efficiency of the memory device.

The block cycling feature within the memory device, encompassing the Randomizer Assisted Block Program and various acceleration modes, enhances efficiency, speed and wear leveling of the memory device of the memory sub-system. Moreover, the flexibility offered by the block cycling feature allows systems to select the most suitable cycling mode based on specific operational specifications, enhancing adaptability to meet various demands. Additionally, by ensuring even wear and reducing stress on individual memory cells of the memory device, the block cycling feature enhances the reliability and data integrity of the memory device. In particular, uniform wear helps prevent premature failure of the memory device, which can otherwise lead to data loss or corruption.

FIG. 1A illustrates a system 100 that includes a memory sub-system 110 that can be a storage device, a memory module or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-volatile, non-transitory computer readable media. The memory device 130 and the memory device 140 can include any combination of the different types of non-volatile memory devices. Some examples of non-volatile memory devices (e.g., memory device(s) 130) include Not-AND (NAND) type flash memory and write-in-place memory, such as three-dimensional cross-point ("3D cross-point") memory. A cross point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include an array 133 (or multiple arrays) of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLCs) or higher, can store multiple bits per cell. In some examples, each of the memory devices 130 can have a combination of different types of memory cells such as SLCs, MLCs, TLCs, QLCs or PLCs. For instance, in some examples, a particular memory device can include an SLC portion, an MLC portion, a TLC portion, a QLC portion and/or a PLC portion of memory cells. The memory cells of the memory devices 130 can be grouped as pages that can refer to a logical unit of the memory device used to store data. In some types of memory (e.g., NAND), pages can be grouped into wordlines and blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory device 130 can include a randomizer 136. The randomizer 136 is integrated with a die of the memory device 130. The randomizer 136 generates random data patterns used in various operations. The randomizer 136 is designed to produce random or pseudo-random data sequences that are employed to ensure even wear of the cells of the array 133. The randomizer 136 operates by taking inputs, such as page addresses, page order (e.g., lower page (LP), upper page (UP) or extra page (EP) in an array that includes TLCs) and/or other parameters, to ensure that the generated random data patterns are unique and appropriate for the specific memory locations being addressed. Thus, these inputs can be considered a randomizer seed.

In various examples, the memory device(s) 130 include a page buffer 137 (e.g., a memory page buffer). The page buffer 137 is employed in read and write operations for the memory device(s) 130. The page buffer 137 is an intermediary storage area that temporarily holds data during the transfer between the memory sub-system controller 115 and the memory device(s) 130. In situations where data is written to the memory device(s) 130, the data is first loaded into the page buffer 137 from the memory sub-system controller 115. From the page buffer 137, the data is then programmed into the appropriate cells of the array 133. Conversely, during a read operation, retrieved data is first placed into the page buffer 137 (e.g., by the local media controller 135) before being sent to the memory sub-system controller 115.

In the memory sub-system 110, superblocks are defined as logical assemblies of data blocks that integrate multiple physical blocks from the memory device 130 and the memory device 140 (e.g., different memory chips) or from distinct planes within a single memory device 130 (e.g., a single chip). The utilization of superblocks improves data management and wear leveling by evenly distributing write and erase cycles across the cells of the array 133. Super-blocks enable efficient data handling by allowing contemporaneous operations across multiple blocks, which enhances the performance and longevity of the memory sub-system 110. However, the integrity and performance of a superblock may be jeopardized if any of the individual blocks within the superblock fails or experiences disproportionate wear compared to the others. This uneven wear can cause data integrity issues and compromise system reliability.

Spare blocks within the memory sub-system 110 operate as a contingency reserve of unused blocks, designated to substitute blocks in a superblock that deteriorate or fail over time. These spare blocks are utilized to preserve data integrity and ensure system reliability, offering replacements for blocks that become unusable due to excessive wear from frequent program-erase cycles or because of defects. The presence of spare blocks ensures that the memory sub-system 110 can maintain effective operation without data loss or notable declines in performance, even as certain blocks exhaust their functional lifespan.

The memory sub-system controller 115 is programmed to replace existing blocks (e.g., of a superblock) with spare block in response to the memory sub-system controller 115 determining that the existing blocks are no longer usable due to excessive wear or failure. This replacement occurs after a particular block has undergone numerous program-erase cycles and reaches a threshold where reliability is compromised, or if a defect is detected in the block. The memory sub-system controller 115 is configured to actively monitors the wear level and health status of each block in the memory sub-system 110. Accordingly, in response to the memory sub-system controller 115 detecting that a given block is nearing the end of its operational life, or detects that the given block has failed, the memory sub-system controller 115 retires the given block and replaces the given block with one of the spare blocks. This process is leveraged to maintain the overall health and efficiency of the memory sub-system controller 115, ensuring data integrity and system reliability by preventing data loss and performance degradation.

Replacement of blocks with spare blocks in the memory sub-system 110 face challenges related to wear level disparities between spare block and superblocks (including the replacement blocks of the superblocks). Spare blocks that are employed to replace worn or failed blocks often have significantly fewer erase and program cycles compared to the older blocks that the spare blocks replace. This discrepancy can lead to issues in wear leveling, a process designed to evenly distribute wear across all blocks to prolong the life of the memory device. For instance, if a spare block with a lower wear level is introduced into a superblock form of more worn blocks, the newer spare block will not have experienced the same level of wear. This uneven wearing can compromise the reliability and data integrity of the memory sub-system 110. The local memory 119 of the memory sub-system controller 115 can store a wear leveling algorithm 144 that can be executed to attempt to ensure that all blocks across the memory device 130 and the memory device 140 have similar wear levels. However, introducing a less worn spare block disrupts this balance, potentially leading to uneven wear and tear across the memory array.

Moreover, this uneven wear can accelerate the degradation of the older blocks of the memory sub-system 110 as the older blocks continue to receive a disproportionate amount of write and erase cycles in an attempt to bring the wear levels into alignment. Consequently, this uneven wearing can lead to data integrity issues and system reliability problems, as the older blocks may fail sooner than expected, necessitating further replacements and potentially leading to a cycle of inefficiency and increased wear on other components of the memory sub-system controller 115.

Previous approaches to spare block wear leveling involve pre-cycling spare blocks to artificially age the spare blocks, aligning the wear level of the spare blocks with those of the blocks already in use within the memory sub-system 110. This process involves intentionally writing and erasing data on the spare blocks a certain number of times to simulate wear. While the approach can help harmonize the wear levels across the memory array, the approach has notable drawbacks. In particular, pre-cycling consumes operational time and resources, as this process consumes additional write and erase cycles that could otherwise be used for actual data storage tasks. Additionally, the previous approach can reduce the overall lifespan of the spare blocks before these blocks are even put into regular use, potentially leading to earlier failures and reduced efficiency of the memory system.

To avoid the problems associated with the previous approaches, the local media controller 135 can be pre-programmed with a block cycling module 139 (e.g., a block cycling feature). The block cycling module 139 represent operations for implementing autonomous and efficient self-cycling of blocks, including spare blocks. In some examples, this block cycling feature enables the generation of random data patterns internally within the memory cells of the array 133 across the memory device(s) 130, reducing dependency on the memory sub-system controller 115 for data generation and management. Additionally, various acceleration modes, such as a Wordline (WL) Acceleration mode, a Wordline Group (WLG) Acceleration mode and a Block Acceleration mode are introduced to enable faster and more efficient programming of blocks. These enhancements not only speed up the process of preparing spare blocks for use but also ensure that these blocks can be integrated into superblocks with minimal wear level disparity, maintaining the integrity and performance of the superblock structure. Accordingly, execution of the operations of the block cycling module 139 enhances the wear leveling process, improves system reliability, and maintains data integrity across the memory sub-system.

The memory sub-system controller 115 executes a block cycling command and initiates the wear leveling algorithm 144 autonomously (e.g., periodically and/or asynchronously). In other examples, the host system 120 sends commands to the memory sub-system controller 115 to initiate the block cycling to manage wear leveling, maintain data integrity and ensure system reliability within the memory subsystem 110. The process implemented by the execution of the wear leveling algorithm 144 helps to balance the wear levels of memory blocks across the array 133 of the memory device(s) 130, including preparing spare blocks for future use.

The command to initiate the block cycling includes details such as the number of cycles to execute and the target blocks for cycling. Responsive to this command, the memory controller 115 executes the wear leveling algorithm 144, and the wear leveling algorithm 144 identifies the physical addresses of the target blocks. Each target block can be located in the array 133 of a corresponding memory device 130. Additionally, the wear leveling algorithm 144 selects a block cycling mode of operation for the wear leveling the target blocks from a set of block cycling mode. The selected block cycling mode of operation could be, for example, a Randomizer Assisted Block Program mode, the WL Acceleration mode, the WLG Acceleration mode or the Block Acceleration mode. The wear leveling algorithm 144 causes the memory sub-system controller 115 to identify a location (e.g., the memory device(s) 130) of the target block, and to send a block cycle feature command to the local media controller 135 of each memory device(s) 130 that includes a target block (or multiple target blocks). The block cycle feature command can include data indicating that the block cycling module 139 of the corresponding memory device 130 is to be executed, a selected block cycling mode, and an address (or multiple address) of a target block within the array 133 of the memory device 130 and the number of cycles to execute.

Figure 1B:
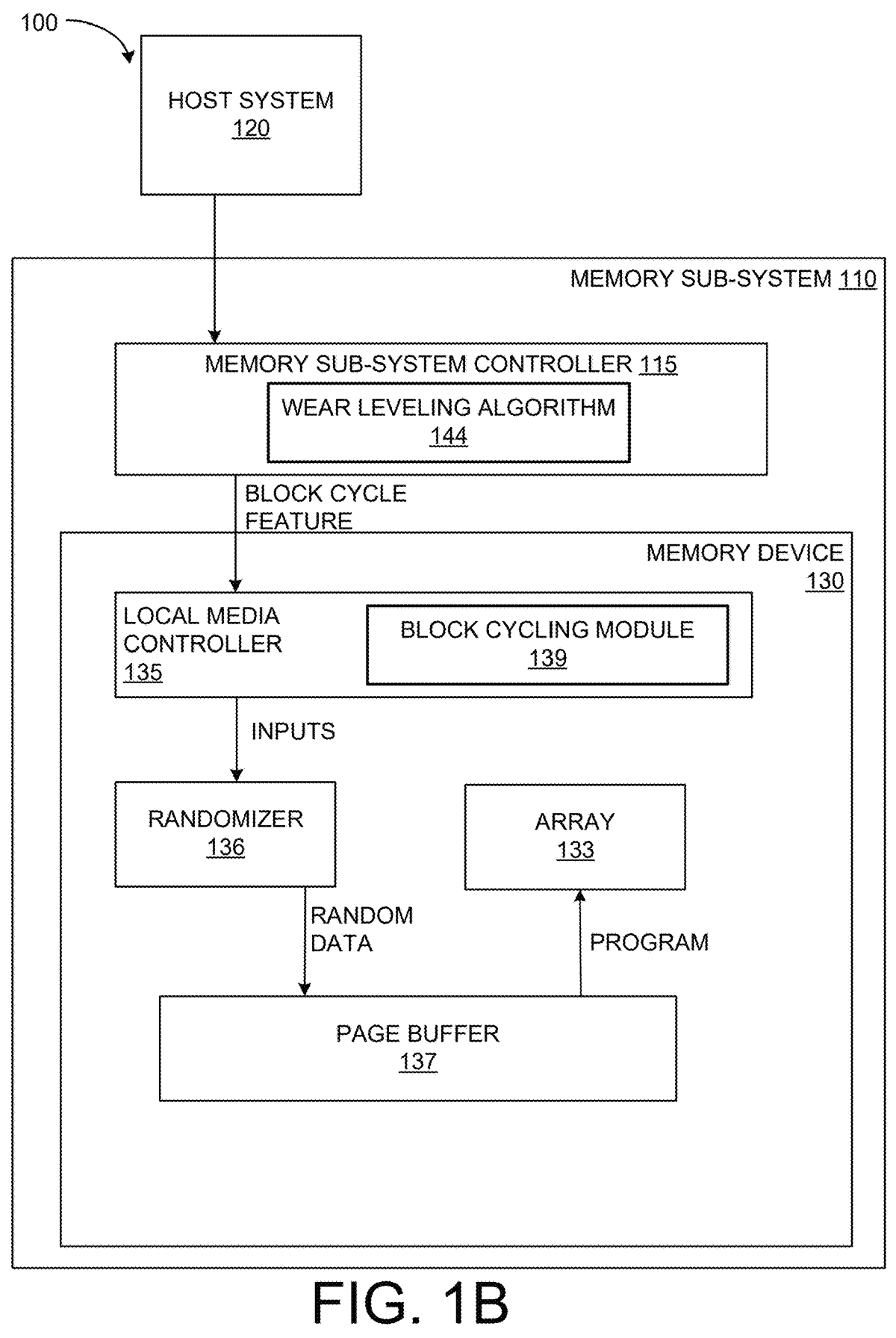

Responsive to the block cycling feature command, the local media controller 135 executes the operations for the block cycling module 139 for the selected block cycling mode in the block cycling feature command. FIG. 1B illustrates a process flow of the system 100 depicting operations of a block cycling command wherein the local media controller 135 executes the Randomizer Assisted Block Program mode, the WL Acceleration mode or the WLG acceleration mode. In the present example, the memory sub-system controller 115 operates autonomously, and generates the cycle block command (e.g., periodically, or in response to a detect event). The cycle block command includes data such as the number of cycles to execute and the target blocks for cycling. In other examples, the memory sub-system controller 115 receives the cycle block command from the host system 120.

Responsive to the block cycle command, the memory sub-system controller 115 executes the wear leveling algorithm 144. The wear leveling algorithm 144 identifies the device(s) 130 that contains the target blocks and selects a mode of operation for executing the wear leveling. In response to identifying the memory device 130, the memory sub-system controller 115 (executing the wear leveling algorithm 144) outputs the block cycle feature command (labeled "BLOCK CYCLE FEATURE" in FIG. 1B) to the local media controller 135. The block cycle feature command can include data indicating that the block cycling module 139 of the corresponding memory device 130 is to be executed, a selected block cycling mode, and an address (or multiple address) of a target block within the array 133 of the memory device 130 and the number of cycles to execute. The selected block cycling mode represented in FIG. 1B could be the Randomizer Assisted Block Program mode, the WL Accelerated mode or the WLG Accelerated mode.

In an example where the selected block cycling mode is the Randomizer Assisted Block Program mode (hereinafter, referred to as the "Randomizer Assisted Example"), in response to the block cycle feature command, the local media controller 135 executes the block cycling module 139 with parameters of the block cycle feature command. In response, the block cycling module 139 provides inputs (labeled "INPUTS" in FIG. 1B) to the randomizer 136 to cause the randomizer 136 to generate random data patterns internally. This random data generation ensures that each memory block targeted for cycling receives a unique data pattern, which helps distribute wear evenly across the memory cells of the array 133. In particular, in the Randomizer Assisted Example, the inputs specify that random data is to be generated for each page in the target block.

Continuing with the Randomizer Assisted Example, responsive to generating the random data, the block cycling module 139 directs this random data to be programmed into the target block. The local media controller 135 manages the addressing and timing of these data writes to ensure that the random data is accurately and efficiently written to the memory cells of the array 133. In particular, the random data is written to the page buffer 137 by the randomizer 136 (labeled "RANDOM DATA" in FIG. 1B). The block cycling module 139 causes the local media controller 135 to program (write) the random data to the array 133 (labeled "PROGRAM" in FIG. 1B) for each page in the target block. Once the data has been written to each page of the target block one full program-erase cycle has been completed. This cycle of generating random data and writing the random data to the array 133 is repeated for the number of cycles as specified in the cycle block command, with new random data generated for each program-erase cycle to prevent pattern repetition and ensure comprehensive wear leveling. Upon completion of the specified number of cycles, the local media controller 135 communicates the completion status back to the host system memory sub-system controller 115, marking the end of the Randomizer Assisted Block Program mode execution.

In an example where the selected block cycling mode is the WL Accelerated mode (hereinafter, referred to as the "WL Accelerated Example"), in response to the block cycle feature command, the local media controller 135 executes the block cycling module 139 with parameters of the block cycle feature command. In response, the block cycling module 139 provides inputs (labeled "INPUTS" in FIG. 1B) to the randomizer 136 to cause the randomizer 136 to generate random data patterns internally. In the WL Accelerated Example, the inputs specify that random data is to be generated for each wordline in the target block. In particular, the block cycling module 139 causes the randomizer 136 to generate random data for a first page of each wordline within the block. This pattern serves as the template for programming an entire wordline. The block cycling module 139 causes the randomizer 136 to write the random data (labeled "RANDOM DATA") to the page buffer 137.

Figure 2:
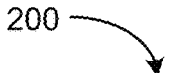
FIG. 2 illustrates a chart representing a target block with wordlines, wherein a wordline (WL) Accelerated mode is executed.
Figure 2:
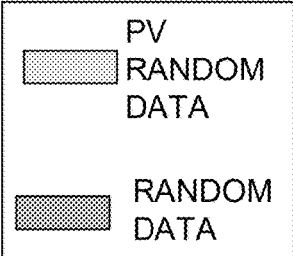

Continuing with the WL Accelerated Example, in response to writing the random data pattern for the first page of each wordline in the target block to the page buffer 137, the block cycling module 139 causes the local media controller 135 to program this random data across each page within a wordline contemporaneously. This contemporaneously programming of entire wordlines accelerates the data programming process, as the contemporaneously programming eliminates the need for sequential page programming. Each wordline, starting with a uniquely generated random pattern, distributes wear evenly across the target block. FIG. 2 illustrates this concept.

FIG. 2 illustrates a chart representing a target block 200 (e.g., from the array 133) with 233 wordlines, wherein the WL Accelerated mode is executed. Continuing with the WL Accelerated Example, Wordline 0 has the random data provided from the page buffer 137 programmed on pages 0-3 of Wordline 0. In the target block 200, Wordline 0, Page 0 is labeled "PV RANDOM DATA" to indicate that this random data is to be verified (in a program verify operation), and Wordline 0, Pages 1-2 are labeled "RANDOM DATA" to indicate that this data is the same random data as Wordline 0, Page 0. Stated differently, in a single programming operation, the random data is written to each page in Wordline 0 contemporaneously, reducing the processing time needed to program random data for each individual page of Worldline 0 of the target block 200. In the WL Accelerated mode, the other wordlines (e.g., wordlines 1-233) are programmed with random data in the same manner.

Referring back to FIG. 1B, continuing with the WL Accelerated Example, in response to programming each wordlines in the target block, the local media controller 135 executes a program verify of page 0 of each wordline in the target block, (as indicated for the PV RANDOM DATA of Wordline 0, Page 0) completing one full program-erase cycle. This cycle is repeated for the number of times specified in the cycling command. In response to completing the specified number of cycles, the local media controller 135 communicates the completion status back to the memory sub-system controller 115, indicating the successful execution of the WL Acceleration mode. The WL Acceleration mode reduces the total time required for programming the target block and ensures effective wear leveling and enhances the overall efficiency of the memory subsystem 110.

In an example where the selected block cycling mode is the WLG Accelerated mode (hereinafter, referred to as the "WLG Accelerated Example"), in response to the block cycle feature command, the local media controller 135 executes the block cycling module 139 with parameters of the block cycle feature command. In response, the block cycling module 139 provides inputs (labeled "INPUTS" in FIG. 1B) to the randomizer 136 to cause the randomizer 136 to generate random data patterns internally. In the WL Accelerated Example, the inputs specify that random data is to be generated for each page in a wordline group (e.g., 9 wordlines) in the target block. In particular, the block cycling module 139 causes the randomizer 136 to generate random data for a first page of the wordline group within the block. This pattern serves as the template for programming the pages of the entire wordline group. The block cycling module 139 causes the randomizer 136 to write the random data (labeled "RANDOM DATA") to the page buffer 137.

Figure 3:
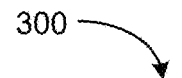
FIG. 3 illustrates a chart representing a target block with wordlines, wherein a wordline group (WLG) Accelerated mode is executed.

Continuing with the WLG Accelerated Example, in response to writing the random data pattern for the first page of each wordline in the target block to the page buffer 137, the block cycling module 139 causes the local media controller 135 to program this random data across each page within the wordline group contemporaneously until an entirety of the block is filled with random data. Stated differently, each page of a selected wordline group is programmed contemporaneously with a corresponding data pattern generated for the selected wordline group. Additionally, the local media controller 135 selects a next wordline group and repeats the contemporaneous programming for the next wordline group until an entirety of the memory block is filled with random data. This contemporaneously programming of each page in the wordline group accelerates the data programming process, as the contemporaneously programming eliminates the need for sequential page or sequential wordline programming. The entire wordline group, starting with a uniquely generated random pattern page, distributes wear evenly across the target block. FIG. 3 illustrates this concept.

FIG. 3 illustrates a chart representing a target block 300 (e.g., from the array 133) with 233 wordlines, wherein the WLG acceleration mode is executed. Continuing with the WLG Accelerated Example, there are 9 worldlines assigned to each worldline group (WLG), but in other examples, there could be more or less wordlines in a WLG. In the example illustrated, there are N number of WLGs, where N is an integer greater than one. For example, in the target block 300, Wordlines 0-8 are assigned to WLG 0 and wordlines 9-17 are assigned to WLG 1, etc. Each page in Wordlines 0-8 has the random data provided from the page buffer 137 programmed on pages 0-3 of the corresponding wordline. Stated differently, in a single programming operation, the random data is written to each page in WLG 0 contemporaneously, reducing the processing time needed to program random data for each individual page or wordline of WLG 0 of the target block 300. In the target block 300, WLG, Wordline 0, Page 0 is labeled "PV RANDOM DATA" to indicate that this data is to be verified (in a program verify operation), and WLG 0, Wordline 0, Pages 1-2, and Wordlines 1-8, Pages 4-34 are labeled "RANDOM DATA" to indicate that this data is the same random data as WLG 0, Wordline 0, Page 0.

Referring back to FIG. 1B, continuing with the WLG Accelerated Example, in response to programming each wordlines in the target block, the local media controller 135 executes a program verify of page 0, wordline 0 of each WLG in the target block, completing one full program-erase cycle (as indicated for the PV RANDOM DATA of WLG 0, Wordline 0, Page 0). Accordingly, each wordline group has a unique random data pattern, and each page in a given wordline group of the memory block has a same random data pattern. This cycle is repeated for the number of times specified in the cycling command. In response to completing the specified number of cycles, the local media controller 135 communicates the completion status back to the memory sub-system controller 115, indicating the successful execution of the WLG Acceleration mode. The WLG Acceleration mode reduces the total time required for programming the target block and ensures effective wear leveling and enhances the overall efficiency of the memory subsystem 110.

Referring back to FIG. 1A, in another example (hereinafter, "Block Acceleration Example") the selected mode for the block cycling feature command (output by the memory sub-system controller 115) is the Block Acceleration mode. The Block Acceleration mode is configured to maximize the efficiency and speed of programming entire blocks within the memory sub-system 110.

In the Block Acceleration mode, the block cycling module 139 causes the local media controller 135 to assert a pre-program signal across cells of the array 133 of an entirety of the target block contemporaneously. Assertion of the pre-program signal elevates the threshold voltage of each cell of the array 133 within the target block uniformly before the block is erased in the same operation. The pre-program signal is a step pulsed signal, and characteristics of the pre-program signal are configurable based on parameters. The pre-program signal is a stepped pulse signal, and the parameters of the pre-program signal, such as voltage, flattop width, step width, step size, pulse width and pulse count, are configurable by the local media controller 135 and/or the memory sub-system controller 115, allowing precise control over the wear effect on the block.

Figure 4:
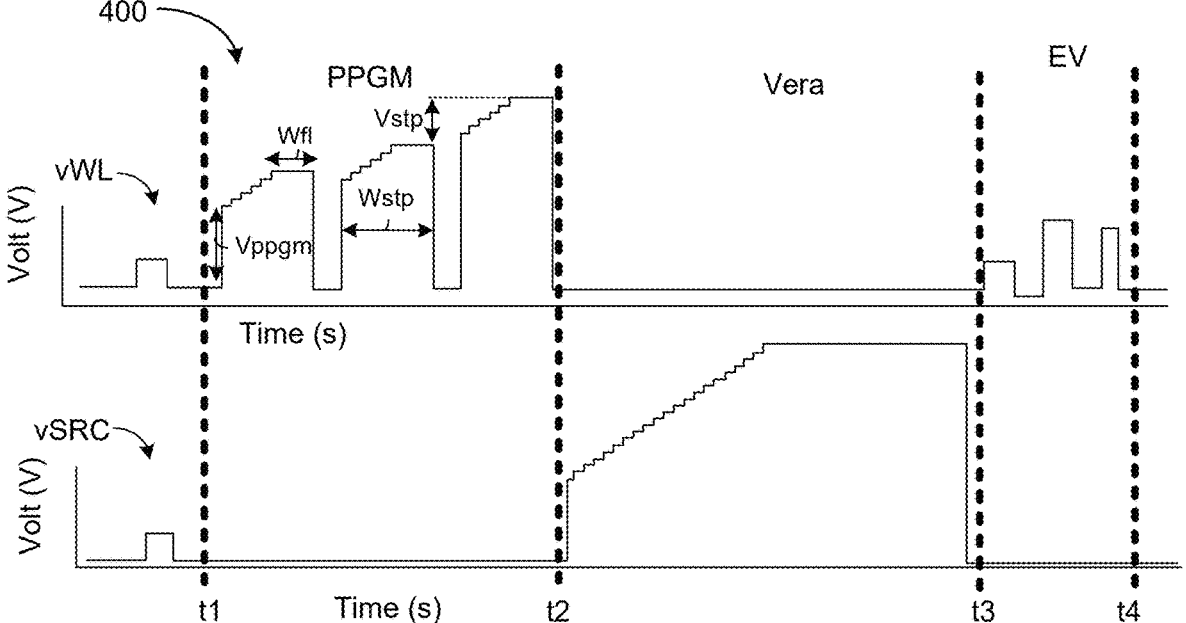
FIG. 4 illustrates an example of a graph that illustrates the pre-program pulse and an erase signal asserted for a Block Acceleration mode.

FIG. 4 illustrates an example of a graph 400 that illustrates the pre-program pulse and an erase operation asserted for the Block Acceleration mode. The signals illustrated in the graph 400 can be considered a single operation. More particularly, the graph 400 plots a source voltage, vSRC and a wordline voltage, vWL as a function of time, in seconds, such a microseconds ($\mu$s) or nanoseconds (ns). The source voltage, vSRC and the wordline voltage, vWL are plotted on the same timeline for comparison. The wordline voltage, vWL is applied to a gate of memory cells in each worldline of a given block contemporaneously (e.g., at or near simultaneously). Additionally, the source voltage is applied to a source of each cell in the given block concurrently. From times t1 to t2, the wordline voltage, vWL asserts a pre-program signal, PPGM.

The pre-program signal, PPGM is a stepped pulsed signal that has a pre-program voltage, Vppgm that defines a rising voltage of a first pulse of the pre-program signal, PPGM. The pre-program signal, PPGM also has a flattop width, Wfl that defines a time interval that each pulse has a peak value. The pre-program signal, PPGM also has a step width, Wstp that defines a time interval between a rising edge and a falling edge of each pulse. The pre-program signal, PPGM also has a step voltage, Vstp that defines a voltage rise between peaks of successive pulses. Moreover, the pre-program signal, PPGM has 3 pulses in the example illustrated. The, pre-program voltage, Vppgm flattop width, Wfl, a step width, Wstp, the step voltage, Vstp and the number of pulses are configurable.

Between times, t2 and t3, the source voltage, vSRC asserts an erasing voltage signal, Vera that is ramped signal with a flattop voltage to each memory cell of the given block. Between times, t3 and t4, the wordline voltage, vWL asserts an erase voltage signal, EV that is formed as a pulsed signal with varying pulse widths and pulse voltages. Thus, the wordline voltage, vWL and the source voltage, vSRC operate in concert between times t2-t4 to assert the erase operation.

Referring back to FIG. 1A, after the assertion of the pre-programming and the erase operation, the memory controller 115 finalizes the process and communicates the completion status back to the host system 120. This communication indicates the successful execution of the Block Acceleration mode. This mode is particularly beneficial in environments where rapid data throughput and quick access times are critical, offering a balance between speed and efficiency in data programming while maintaining effective wear leveling across the memory subsystem.

Assertion of the pre-program pulse uniformly modifies a threshold voltage of all cells in the block. This uniformity helps in achieving even wear across an entirety of block of the array 133 when the erase operation is executed. Uniform wear also helps to maintain the longevity and reliability of the NAND flash memory.

Each described mode has advantages and costs relatively to the other modes. Thus, selecting the appropriate programming mode tunes specific aspects of memory operations, such as speed, efficiency, wear leveling and cell threshold voltage distribution. In particular, the Randomizer Assisted Block Program mode ensures that each page within a block receives a unique random data pattern, mimicking a normal host usage and behavior (e.g., program page-by-page) of the memory device(s) 130. This Randomizer Assisted Block Program mode is suitable for applications where having an evenly distributed cell threshold voltage in the array 133 is preferred.

The WL Acceleration mode accelerates the programming process by applying a random data pattern to the first page of each wordline and then programming all pages in the wordline simultaneously. This WL Acceleration mode is selected to reduce a time need for programming a block compared to sequential page-by-page programming and is suitable for applications that need moderate speed improvements while still maintaining a focus on wear leveling and cell threshold voltage distribution. In the WL Accelerated mode, each wordline with a block has a unique random data pattern. The WLG Acceleration mode extends the concept of WL Acceleration mode to groups of wordlines, allowing for faster programming by handling multiple wordlines at once.

This WLG Acceleration mode is efficient for larger blocks and is well-suited for environments where faster programming speeds are necessary but some level of wear leveling is still beneficial. In the WLG Acceleration mode, each WLG has a unique random data pattern.

The Block Acceleration mode offers the fastest method for programming and erasing by applying a pre-program pulse across the entire block concurrently, followed by an erase operation. The Block Acceleration mode can be leveraged in high-throughput environments where programming speed is the paramount concern. The Block Acceleration mode is recommended for scenarios where rapid processing is essential, such as in temporary storage or caching applications where the cell voltage distribution in the array 133 is less critical.

Each such programming mode in the memory sub-system 110 is designed to meet specific system requirements, allowing engineers and system designers to tune performance and reliability according to the precise needs of different applications. Understanding the strengths and applications of each programming mode facilitates the effective management of the memory sub-system 110 in various technological environments.

Figure 5:
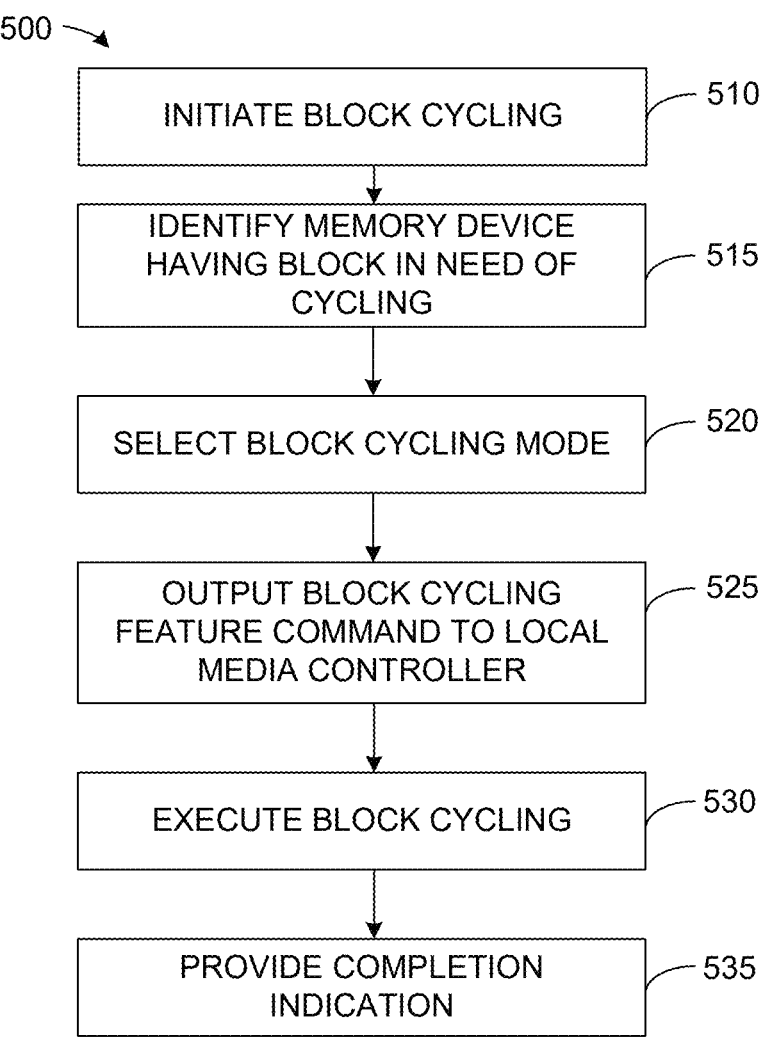
FIG. 5 illustrates a flowchart of an example method for increasing a wear level of a memory block.

FIG. 5 illustrates a flowchart of an example method 500 for managing wear levels of memory cells in a non-volatile memory device (e.g., the device 130). The method 500 can be executed, for example, by a memory controller (e.g., the memory sub-system controller 115) and a local media controller (e.g., local media controller 135) of the memory device operating in concert. At block 510, the memory controller initiates a block cycling operation on a memory block within the non-volatile memory device. The initiation could be periodic and/or asynchronous (e.g., in response to a detected condition). At block 515, the memory controller identifies the memory device that contains the memory block needing the cycling. At 520, the memory controller selects a block cycling mode from a set of block cycling modes. The selection can be predetermined or based on criteria. The set of block cycling modes include the Randomizer Assisted Block program mode, the WL Acceleration mode, the WLG Acceleration mode and the Block Acceleration mode. At 525, the memory controller outputs a block cycling feature command to the local media controller of a memory device that includes the memory block.

At 530, the local media controller executes the selected block cycling mode to program the memory block responsive to the block cycling feature command to increase a wear level of the memory block. The selected block cycling mode can include multiple cycles of writing, rewriting or erasing data to precisely control a wear of memory cells of the memory device, as explained herein. At 535, the local media controller provides a completion indication to the media controller, indicating that the cycling of the memory block is successful.

Figure 6:
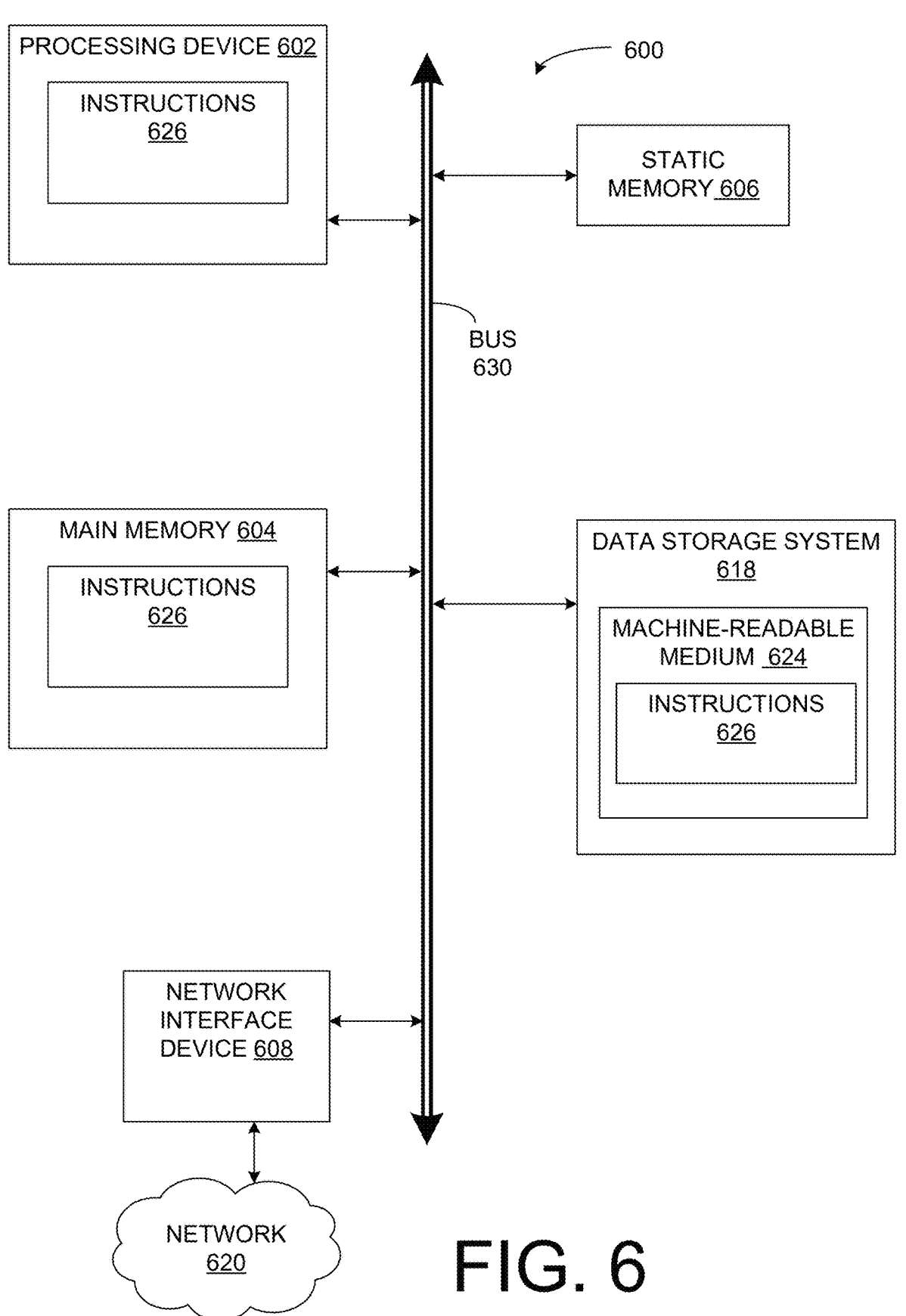
FIG. 6 illustrates an example machine of a computer system (a machine) within which a set of instructions, for causing the machine to perform any one or more of the methodologies discussed herein, can be executed.

FIG. 6 illustrates an example machine of a computer system 600 (a machine) within which a set of instructions, for causing the machine to perform any one or more of the methodologies discussed herein, can be executed. In some examples, the computer system 600 corresponds to a host system (e.g., the host system 120 of FIG. 1A) that includes, is coupled to, or utilizes a memory sub-system (e.g., the memory sub-system 110 of FIG. 1A) or is used to perform the operations of a controller. In other examples, the machine is connected (e.g., networked) to other machines in a LAN, an intranet, an extranet and/or the Internet. In various examples, the machine operates in the capacity of a server or a client machine in client server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automobile, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM) or other non-transitory computer-readable media) and a data storage system 618, which communicate with each other via a bus 630.

The processing device 602 represents one or more general-purpose processing devices such as a microprocessor, a central processing unit, etc. More particularly, the processing device 602 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 602 is implemented with a special-purpose processing devices such as an application specific integrated circuit (ASIC), a field programmable gate array (FPGA), a digital signal processor (DSP), network processor, etc. The processing device 602 is configured to execute instructions 626 for performing the operations discussed herein, such as wear leveling algorithm 144 and/or the block cycling module 139. In some examples, the computer system 600 includes a network interface device 608 to communicate over the network 620.

The data storage system 618 includes a machine-readable storage medium 624 (also known as a computer-readable medium) that store sets of instructions 626 or software for executing the methodologies and/or functions described herein. The machine-readable storage medium 624 is a non-transitory medium. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618 and/or main memory 604 can correspond to the memory sub-system 110 of FIG. 1A. Accordingly, the machine-readable storage medium 624, the data storage system 618 and/or the main memory 604 are examples of non-transitory computer-readable media.

In some examples, the instructions 626 include instructions for a wear leveling algorithm and a block cycling feature. While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for managing wear leveling in a non-volatile memory device, the method comprising:

initiating, by a memory controller, a block cycling operation on a memory block within the non-volatile memory device;

selecting, by the memory controller, a block cycling mode from a set of block cycling modes;

outputting, by the memory controller, a block cycling feature command to a local media controller of a memory device that includes the memory block, the block cycling feature command including data indicating the selected block cycling mode and an address of the memory block; and executing, by the local media controller, responsive to the block cycling feature command, the selected block cycling mode to program the memory block responsive to the block cycling feature command to increase a wear level of the memory block, wherein the local media controller autonomously executes operations of the selected block cycling mode using a randomizer integrated on a die of the memory device to internally generate data patterns for programming the memory block.

2. The method of claim 1, wherein the selected block cycling mode is a Randomizer Assisted Block Program mode, and the executing further comprises:

generating a random data pattern using the randomizer, wherein the randomizer generates a respective unique random data pattern for each page in the memory block; and programming each page in the memory block with the respective unique random data pattern generated for that page, such that each page of the memory block has a unique random pattern.

3. The method of claim 1, wherein the selected block cycling mode is a Wordline Acceleration mode, and the executing further comprises:

generating, by the randomizer, a respective random data pattern for a first page of each wordline within the memory block, wherein the randomizer generates a different respective random data pattern for each wordline; and programming the respective random data pattern contemporaneously to each page within each wordline of the memory block, such that each wordline has a unique random pattern, and each page with a given wordline of the memory block has a same random data pattern as the respective random data pattern generated for the given wordline.

4. The method of claim 1, wherein the selected block cycling mode is a Wordline Group Acceleration mode, and the executing further comprises:

generating, by the randomizer, a respective random data pattern for a first page of each wordline group within the memory block, wherein the randomizer generates a different respective random data pattern for each wordline group;

programming each page of a selected wordline group contemporaneously with a corresponding data pattern generated for the selected wordline group; and selecting a next wordline group and repeating the programming for the next wordline group until an entirety of the memory block is filled with random data, such that each wordline group has a unique random data pattern, and each page in a given wordline group of the memory block has a same random data pattern, as the respective random data pattern generated for the given wordline group.

5. The method of claim 1, wherein the selected block cycling mode is a Block Acceleration mode, and the executing further comprises:

asserting a pre-program pulse across an entirety of block; and erasing the entirety of the memory block in a same operation as the pre-program pulse.

6. The method of claim 5, wherein characteristics of the pre-program pulse are controlled by parameters included in the block cycling feature command, the parameters including voltage, step size, pulse width and/or pulse count.

7. The method of claim 1, wherein the block cycling operation is configured to autonomously execute programming cycles on memory blocks to curtail wear level disparity between spare blocks and superblocks, and the spare blocks are pre-cycled by the block cycling operation to artificially age the spare blocks and align wear levels of the spare blocks with wear levels of blocks in the superblocks prior to the spare blocks being used to replace blocks in the superblocks.

8. The method of claim 1, wherein the memory device is a Not-AND (NAND) memory chip and the block cycling operation is used to maintain even distribution of program-erase cycles across memory cells of the memory device.

9. A system for managing wear leveling in a non-volatile memory device, the system comprising:

a memory device with a block cycling module configured to cycle memory blocks of the memory device, the block cycling module including a randomizer integrated on a die of the memory device; and a memory controller programmed to:

identify the memory device as having a memory block in need of cycling to increase a wear level of the memory block;

select a block cycling mode from a set of block cycling modes; and output a block cycling feature command to the memory device that identifies the selected block cycling mode and an address of the memory block;

wherein the memory device executes the selected block cycling mode to program the memory block responsive to the block cycling feature command, and the memory device autonomously executes operations of the selected block cycling mode using the randomizer to internally generate data patterns for programming the memory block.

10. The system of claim 9, wherein the selected block cycling mode is a Randomizer Assisted Block Program mode, and the executing of the block cycling mode further comprises:

generating a respective random data pattern using the randomizer, wherein the randomizer generates a different respective random data pattern for each wordline; and programming each page in the memory block with the respective random data pattern, such that each page of the memory block has a unique random pattern.

11. The system of claim 9, wherein the selected block cycling mode is a Wordline Acceleration mode, and the executing of the block cycling mode further comprises:

generating, by the randomizer, a respective random data pattern for a first page of each wordline within the memory block, wherein the randomizer generates a different respective random data pattern for each wordline; and programming the respective random data pattern contemporaneously to each page within each wordline of the memory block, such that each wordline has a unique random pattern, and each page with a given wordline of the memory block has a same random data pattern as the respective random data pattern generated for the given wordline.

12. The system of claim 9, wherein the selected block cycling mode is a Wordline Group Acceleration mode, and the executing of the block cycling mode further comprises:

generating, by the randomizer, a respective random data pattern for a first page of each wordline group within the memory block, wherein the randomizer generates a different respective random data pattern for each wordline group;

programming each page of a selected wordline group contemporaneously with a corresponding data pattern generated for the selected wordline group; and selecting a next wordline group and repeating the programming for the next wordline group until the memory block is filled with random data, such that each wordline group has a unique random data pattern, and each page in a given wordline group of the memory block has a same random data pattern as the respective random data pattern generated for that given wordline group.

13. The system of claim 9, wherein the selected block cycling mode is a Block Acceleration mode, and the executing of the block cycling mode further comprises:

asserting a pre-program pulse across an entirety of the memory block; and erasing the entirety of the memory block in a same operation as the pre-program pulse.

14. The system of claim 13, wherein characteristics of the pre-program pulse are controlled by parameters included in the block cycling feature command, the parameters including voltage, step size, pulse width and/or pulse count.

15. The system of claim 9, wherein the memory device is a Not-AND (NAND) memory device and the cycling is initiated to maintain even distribution of program-erase cycles across memory cells of the memory device.

16. A non-transitory computer-readable medium storing instructions that, when executed by a processor, perform operations for managing wear leveling in a non-volatile memory system, the operations comprising:

identifying a memory device that contains a memory block in need of cycling, the memory device including a block cycling module with a randomizer integrated on a die of the memory device;

selecting a block cycling mode from a set of block cycling modes; and outputting a block cycling feature command to the memory device that identifies the selected mode and an address of the memory block, wherein the memory device executes the selected block cycling mode to program the memory block responsive to the block cycling feature command to increase a wear level of the memory block, and the memory device autonomously executes operations of the selected block cycling mode using the randomizer to internally generate data patterns for programming the memory block.

17. The non-transitory computer-readable medium of claim 16, wherein the selected block cycling mode is a Randomizer Assisted Block Program mode, and the executing further comprises:

generating a random data pattern using the randomizer, wherein the randomizer generates a respective unique random data pattern for each page in the memory block; and programming each page in the memory block with the respective unique random data pattern generated for that page, such that each page of the memory block has a unique random pattern.

18. The non-transitory computer-readable medium of claim 16, wherein the selected block cycling mode is a Wordline Acceleration mode, and the executing further comprises:

generating, by the randomizer, a respective random data pattern for a first page of each wordline within the memory block, wherein the randomizer generates a different respective random data pattern for each wordline; and programming the respective random data pattern contemporaneously to each page within each wordline of the memory block, such that each wordline has a unique random pattern, and each page with a given wordline of the memory block has a same random data pattern as the respective random data pattern generated for the given wordline.

19. The non-transitory computer-readable medium of claim 16, wherein the selected block cycling mode is a Wordline Group Acceleration mode, and the executing further comprises:

generating, by the randomizer, a respective random data pattern for a first page of each wordline group within the memory block, wherein the randomizer generates a different respective random data pattern for each wordline group;

programming each page of a selected wordline group contemporaneously with a corresponding data pattern generated for the selected wordline group; and selecting a next wordline group and repeating the programming for the next wordline group until the memory block is filled with random data, such that each wordline group has a unique random data pattern, and each page in a given wordline group of the memory block has a same random data pattern as the respective random data pattern generated for that given wordline group.

20. The non-transitory computer-readable medium of claim 16, wherein the selected block cycling mode is a Block Acceleration mode, and the executing further comprises:

asserting a pre-program pulse across an entirety of the memory block; and erasing the memory block in a same operation as the pre-program pulse.

\* \* \* \* \*